Feb. 7, 1956     A. TURAK     2,733,730
DOUBLE VALVE FLOW CONTROL

Filed Aug. 29, 1951     2 Sheets-Sheet 1

INVENTOR.
ANTHONY TURAK
BY Woodling and Krost
attys

Feb. 7, 1956 A. TURAK 2,733,730
DOUBLE VALVE FLOW CONTROL
Filed Aug. 29, 1951 2 Sheets-Sheet 2
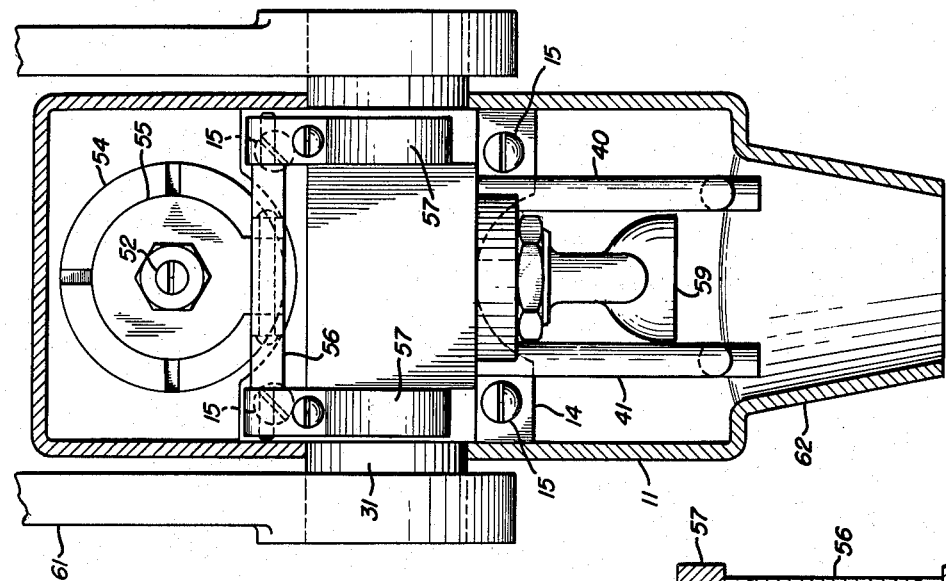
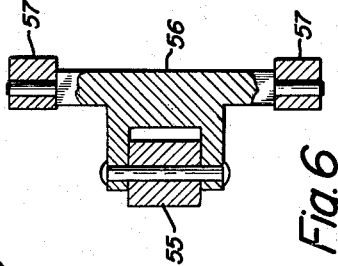
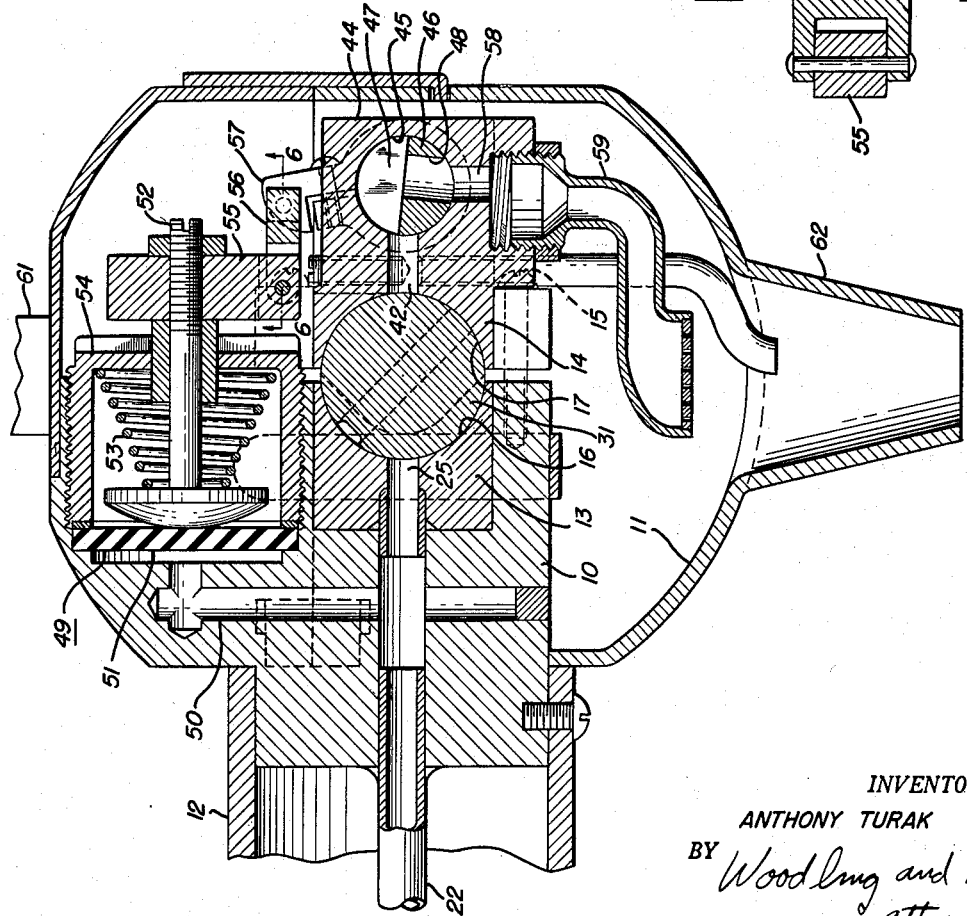
INVENTOR.
ANTHONY TURAK
BY Woodling and Krost
attys

United States Patent Office 2,733,730
Patented Feb. 7, 1956

2,733,730

DOUBLE VALVE FLOW CONTROL

Anthony Turak, Cleveland, Ohio

Application August 29, 1951, Serial No. 244,155

7 Claims. (Cl. 137—505.13)

This invention relates generally to valve structures, and relates specifically to a dispensing and mixing valve for sirup concentrates and carbonated water.

This application is a continuation-in-part of application Ser. No. 168,628, filed June 16, 1950.

An object of this invention is to provide a dispensing and mixing valve for two or more different kinds of soft drinks, or plain carbonated water.

Another object of this invention is to provide a valve structure which has a primary on-off control, and a flow control to determine the ratio of fluid dispensed when the primary control is opened.

A further specific object of this invention is to provide a flow rate control in addition to the on-off control to stabilize the discharge of a variable pressure fluid.

Other objects and a fuller understanding of the invention may be had by referring to the following description and claims, taken in conjunction with the accompanying drawings, in which:

Figure 4 is an enlarged sectional view taken along line 4—4 of Figure 2.

Figure 5 is a view taken along line 5—5 of Figure 1 with the cover broken away and shown in section, and Figure 6 is a sectional view of a detail of construction.

Figure 1:
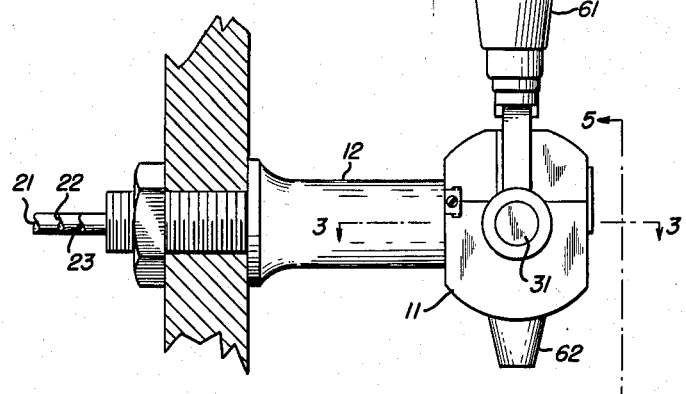
Figure 1 is a side elevation of a valve structure incorporating the features of this invention.

The drawing illustrates a tested, serviceable mixing and dispensing valve made according to the principles of this invention. This valve comprises a valve body 10 positioned within a casing 11. A tubular mounting 12 is provided to support the valve upon a convenient wall or cabinet.

The valve body 10, in this embodiment of the invention, includes a body section 13 and a body section 14. Section 13 has a cylindrical concave surface 16, and section 14 has a cylindrical concave surface 17. The two sections 13 and 14 are held as an operative unit by bolts 15. Three conduits 21, 22 and 23 lead into the valve body 10. These conduits may be of any conventional type, and are welded into permanent union with the body section 13. Bores 24, 25 and 26 are provided through the body section 13 from the conduits 21, 22 and 23, respectively.

This dispensing and mixing valve structure is normally employed for dispensing cola and ginger ale drinks and soda water in taverns. Taverns desire to have small glasses of either cola or ginger ale soft drinks, and sometimes just plain soda water is preferred. Accordingly, conduit 21 may be attached to a gravity or pressurized supply of cola concentrate sirup, and conduit 23 may likewise be attached to a gravity or pressurized ginger ale sirup concentrate source. The conduit 22 will be attached to a pressurized source of carbonated water. Each of the fluids will tend to flow through the bores 24, 25 and 26 without restraint. Accordingly, a valve mechanism is employed to control the flow of the fluid through the bores. The illustrated embodiment employs a cylindrical valve rod 31. The valve rod 31 is clamped in close-fitting relationship between the cylindrical surfaces 16 and 17.

Figure 2:
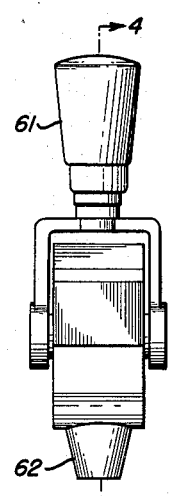
Figure 2 is a front view of the valve.

The cylindrical valve rod 31 is provided with a plurality of passageways therethrough to conduct fluid from each of the bores through the body section 13. In the illustrated embodiment, there are four passageways 32, 33, 34 and 35. The passageways 32 and 33 are aligned angularly with respect to one another, and the passageways 34 and 35 are likewise aligned angularly with respect to one another. However, the two passageways 32 and 33 are angularly rotated with respect to the passageways 34 and 35. Accordingly, the entrance ends and the exhaust ends of the two sets of passageways are angularly displaced along the surface of the valve rod 31. A handle 61 is provided, as best illustrated in Figures 1 and 2, to rotate the cylindrical valve rod about its longitudinal axis. Therefore, movement of the handle 61 to the left of the neutral position illustrated in Figure 1 will position the entrance ends of the passageways 32 and 33 in registration with the bores 24 and 25. Likewise, movement of the handle 61 to the right of the position illustrated in Figure 1 will bring the entrance ends of the passageways 35 and 34 into registration with the bores 26 and 25, respectively. Movement of the handle 61 to the neutral position of Figure 1 will take all of the passageways out of registration with the bores, and accordingly prevent the flow of fluid through the valve rod 31. It is now apparent that if the conduit 21 is connected to a source of cola sirup concentrate and the conduit 22 is connected with a source of carbonated water, movement of the handle 61 to the left of the position illustrated in Figure 1 will dispense a mixture of cola sirup and soda water. Likewise, movement to the right of the handle 61 will dispense a mixture of ginger ale sirup and soda water.

As thus far described, the valve mechanism of this invention is operative to dispense one of two types of drink mixtures from the same dispensing valve. A valve mechanism is provided to turn either of the sources on and off, or to stop the flow of fluid through the valve entirely. However, it has been found in actual operation that the pressure available upon the soda in conduit 22 will vary considerably even during a one-hour period, if the use of the fluid is of any extent. Accordingly, this invention provides not only an on-off valve control 31, but has the further provision of a flow-rate control.

On the opposite side of the valve body 10, from the passageways 24, 25, and 26, are outlet passageways 40, 41, and 42 to receive the fluids passed through the valve rod 31. In Figure 5 of the drawings, the outlet passageways 40 and 41 are illustrated as being tubes leading directly down from the section 14 of the valve body 10 into a spout 62 at the bottom side of casing 11. The outlet passage 42 leading from the opposite side of the valve plug 31 from the conduit 22 is controlled by a governor valve to limit the flow of fluid from the conduit 22 to a predetermined, stabilized rate. In order to automatically stabilize the rate of flow from the outlet passageway 42, a second valve body 44 is provided. The valve body 44 is very similar in construction to the valve body 10. The outlet passageway 42 from the valve body 10 constitutes an entrance passageway into valve body 44.

The valve body 44 has a valve socket chamber 45 therein similar to the valve socket chamber defined by the concave inner surfaces 16 and 17 within the valve body 10. A governor valve plug 46 resides within the valve socket chamber 45 and is rotative about its longitudinal axis. An outlet bore 58 opens downwardly from the bottom of the valve socket chamber 45 through the valve body 44.

Figure 3:
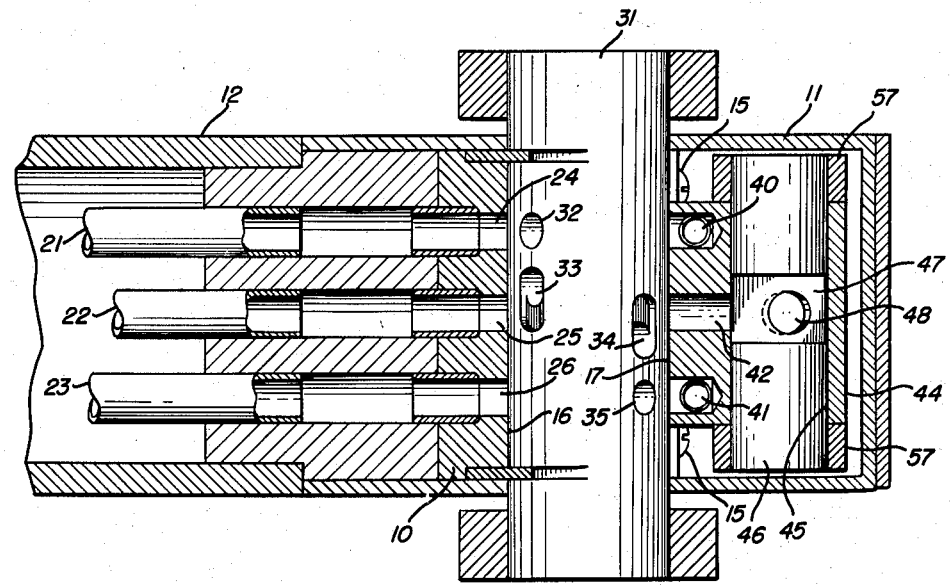
Figure 3 is a sectional view taken along the line 3—3 of Figure 1.

The governor valve plug 46 is a longitudinal member in this particular embodiment of the invention, as best illustrated in Figure 3 of the drawings. A milled slot 47 and a bore 48 constitute the passageway through the governor valve plug 46. By rotation of the governor valve plug 46 about its longitudinal axis within the valve socket chamber 45, the entrance way 42 into the valve body 44 is selectively choked to thereby limit the flow of fluid through the passageway 42, and consequently, limits and controls the discharge from conduit 22. It is not desired to use the governor valve plug 46 as an on-off valve and, accordingly, the valve is never rotated to the extent that it will completely close the passageway 42.

A spray nozzle 59 is positioned to receive the discharge of fluid through bore 48, and conduct the fluid to a central position above the spout 62 and, there, spray the fluid downwardly rather than permit it to flow as a solid body. Better mixing of water with the cola sirups is, thereby, achieved.

In fountain distribution systems, the carbonated water is the most variable fluid supplied to the mixing valves. The sirup containers usually can be held under a fairly constant pressure; not so with the carbonated water. Accordingly, unless the flow of carbonated water is closely controlled, the strength of the mixed drink will be uncontrolled. The governor valve of this application may be rotated any predetermined amount to choke back the flow of the carbonated water when the pressure from the supply force is high, and may be rotated to gradually open the line and yield a greater amount of passageway space as the pressure on the water decreases. However, a busy clerk has little time to constantly check the rate of water discharge from such a mixing valve, and make the necessary adjustments to keep the flow of water properly regulated. Accordingly, the automatic pressure responsive valve control mechanism of this application has been provided to make the control of the rate of flow responsive to the pressure within the supply line 22. To accomplish such automatic control, a pressure responsive device 49 has been provided. A branch passageway 50 is tapped into the passageway 25 and is closed off by a resilient diaphragm 51. The diaphragm 51 will respond to the pressure within the conduit 22 by expanding outwardly as the pressure increases. A ram 52 is mounted within a housing 54 and urged against the diaphragm 51 by a spring 53. Thus, the fluid pressure on the diaphragm 51 and the pressure of the spring 53 are in opposition to one another, and movement of the ram 52 will proceed in one direction when the pressure upon the diaphragm is great enough to exceed the fixed pressure of the spring 53, and will progress in the opposite direction when that pressure falls below the fixed force of the spring 53. The reciprocating movement of the ram 52 is, therefore, available to drive the valve plug 46 about its longitudinal axis in direct relation to the pressure within the conduit 22.

Although the conversion of the longitudinal reciprocation of the ram 52 to an oscillating rotary motion may be done in many different ways, I have illustrated two lever collar members 57 attached to the ends of the governor valve plug 46 to furnish both a driving lever and a longitudinal positioning means for the valve plug 46. A yoke 56, set forth in detail in the Figure 6, interconnects between a collar 55 carried on the end of ram 52 and the lever collars 57. The yoke 56 is pivotally connected to both the collar 55 and the lever collars 57.

The lever collars 57 may be temporarily loosened from the valve plug rod 46 and the relative position of the valve plug 46 with respect to the lever collars 57 altered to adjust the discharge rate to any particular requirements.

It has been found that, once the above described and illustrated flow-rate control valve has been adjusted to control the flow of fluid therethrough to a predetermined rate, the rate will remain substantially constant, regardless of the fluctuations of the pressure within the conduit.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a three-way mixing and dispensing valve having, a valve body, three passageways through said valve body, selector shut-off valve means having a first position closing said three passageways, having a second position opening a first combination of two of said passageways, and having a third position opening a second combination of two of said passageways, one of said passageways thereby being common to each of said combinations, said valve body having an outlet conduit for each passageway opening therefrom to the outer surface of said valve body, the provision of a flow rate governor valve in the conduit of said common passageway, said governor valve having a range of fluid conductiveness, said range having a minimum greater than zero, fluid pressure responsive means operatively connected to said common passageway ahead of said shut-off valve means, control transmission means from said fluid pressure responsive means to said governor valve to thereby operate said governor valve responsively to the pressure in said common passageway ahead of said shut-off valve means, and resilient means urging said governor valve and fluid pressure responsive means toward a fully open flow condition.

2. In a three-way mixing and dispensing valve having, a valve body, three passageways through said valve body, selector shut-off valve means having a first position closing said three passageways, having a second position opening a first combination of two of said passageways, and having a third position opening a second combination of two of said passageways, one of said passageways thereby being common to each of said combinations, said valve body having an outlet conduit for each passageway opening therefrom to the outer surface of said valve body, the provision of a valve socket chamber in the outlet conduit from said valve body for said common passageway, a valve plug rotatably mounted fluid-tight in said valve socket chamber, a passageway through said valve plug, said passageway having an entrance end opening through the side wall of said valve plug, said entrance end opening registrable to a selected degree with said outlet conduit from the common passageway by rotation of the valve plug in said valve socket chamber, a fluid pressure responsive diaphragm device connected into said common passageway ahead of said shut-off valve means, drive control transmission means connecting said rotatable valve plug into driven relationship from said diaphragm device, and spring means urging said valve plug to a closed position, whereby the flow from said common passageway may be controlled by said shut-off valve means and the rate of flow stabilized by the pressure within the common passageway.

3. In a mixing and dispensing valve having a valve body, first and second passageways through said valve body, selector shut-off valve means having a first position closing said passageways and having a second position opening said passageways, said first and second passageways adapted to be connected to fluids under pressure, said valve body having outlet conduit means for each passageway opening therefrom to a mixer spout at the outer surface of said valve body, the provision of a flow rate governor valve in one of said passageways, said governor valve having a range of fluid conductiveness, fluid pressure responsive means operatively connected to said second passageway ahead of said shut-off valve means, control transmission means from said fluid pressure responsive means to said governor valve to thereby operate said governor valve responsively to the pressure in said second passageway ahead of said shut-off valve means, and resilient means connected in opposition to the force of said fluid pressure responsive means, whereby a uniform mixture of first and second fluids is obtainable at said mixer spout despite fluctuations of relative pressure of said fluids.

4. In a mixing and dispensing valve having a valve body, first and second passageways through said valve body, selector shut-off valve means having a first position closing said passageways and having a second position opening said passageways, said valve body having outlet conduit means for each passageway opening therefrom to a mixer spout at the outer surface of said valve body, the provision of a flow rate governor valve in said second passageway, said governor valve having a range of fluid conductiveness, fluid pressure responsive means operatively connected to said second passageway ahead of said shut-off valve means, control transmission means from said fluid pressure responsive means to said governor valve to thereby operate said governor valve responsively to the pressure in said second passageway ahead of said shut-off valve means, and resilient means urging said governor valve and fluid pressure responsive means toward a fully open flow condition, whereby a uniform mixture of first and second fluids is obtainable at said mixer spout despite fluctuations of relative fluid pressure in said passageways.

5. In a three-way mixing and dispensing valve having a valve body, first, second, and third passageways through said valve body, selector shut-off valve means having a first position closing said three passageways, having a second position opening said first and second passageways, and having a third position opening said second and third passageways, said first, second, and third passageways adapted to be connected to fluids under pressure, said valve body having outlet conduit means for each passageway opening therefrom to a mixer spout at the outer surface of said valve body, the provision of a flow rate governor valve in at least one of said passageways, said governor valve having a range of fluid conductiveness, fluid pressure responsive means operatively connected to said second passageway ahead of said shut-off valve means, control transmission means from said fluid pressure responsive means to said governor valve to thereby operate said governor valve responsively to the pressure in said second passageway ahead of said shut-off valve means, and resilient means connected in opposition to the force of said fluid pressure responsive means, whereby uniform mixtures of fluids from said first and second passageways and of fluids from said second and third passageways are obtainable at said mixer spout despite fluctuations of fluid pressure in said second passageway.

6. In a three-way mixing and dispensing valve having a valve body, first, second, and third passageways through said valve body, selector shut-off valve means having a first position closing said three passageways, having a second position opening said first and second passageways, and having a third position opening said second and third passageways, said first, second, and third passageways adapted to be connected to fluids under pressure, said valve body having outlet conduit means for each passageway opening therefrom to a mixer spout at the outer surface of said valve body, the provision of a flow rate governor valve in said second passageway, said governor valve having a range of fluid conductiveness, fluid pressure responsive means operatively connected to said second passageway ahead of said shut-off valve means, control transmission means from said fluid pressure responsive means to said governor valve to thereby operate said governor valve responsively to the pressure in said second passageway ahead of said shut-off valve means, and resilient means urging said governor valve and fluid pressure responsive means toward a fully open flow condition, whereby uniform mixtures of fluids from said first and second passageways and of fluids from said second and third passageways are obtainable at said mixer spout despite fluctuations of fluid pressure in said second passageway.

7. In a three-way mixing and dispensing valve having a valve body, three passageways through said valve body, selector shut-off valve means having a first position closing said three passageways, having a second position opening a first combination of two of said passageways, and having a third position opening a second combination of two of said passageways, one of said passageways thereby being common to each of said combinations, said valve body having an outlet conduit for each passageway opening therefrom to the outer surface of said valve body, the provision of a flow rate governor valve in at least one of said passageways, said governor valve having a range of fluid conductiveness, said range having a minimum greater than zero, fluid pressure responsive means operatively connected to said common passageway ahead of said shut-off valve means, control transmission means from said fluid pressure responsive means to said governor valve to thereby operate said governor valve responsively to the pressure in said common passageway ahead of said shut-off valve means, and resilient means connected in opposition to the force of said fluid pressure responsive means.

References Cited in the file of this patent

UNITED STATES PATENTS

| | | |
|---|---|---|
| Re. 23,109 | Di Pietro | May 10, 1949 |
| 1,515,768 | Damon | Nov. 18, 1924 |
| 2,160,582 | Brugma | May 30, 1939 |
| 2,560,948 | Hannibal | July 17, 1951 |